United States Patent
Kupferberg et al.

(10) Patent No.: US 9,010,053 B1
(45) Date of Patent: Apr. 21, 2015

(54) HIGH STRENGTH THERMAL BARRIER PANEL FOR AN H.V.A.C. UNIT HOUSING

(71) Applicant: Robert Jeffrey Kupferberg, Hampstead (CA)

(72) Inventors: Robert Jeffrey Kupferberg, Hampstead (CA); Ilye Meldrum, Terrebonne (CA)

(73) Assignee: Robert Jeffrey Kupferberg, Hampstead, QC (CA)

( * ) Notice: Subject to any disclaimer, the term of this patent is extended or adjusted under 35 U.S.C. 154(b) by 0 days.

(21) Appl. No.: 14/271,772

(22) Filed: May 7, 2014

Related U.S. Application Data

(63) Continuation-in-part of application No. 14/166,059, filed on Jan. 28, 2014.

(51) Int. Cl.
  *E04C 1/00* (2006.01)
  *E04C 2/38* (2006.01)

(52) U.S. Cl.
  CPC .................................. *E04C 2/384* (2013.01)

(58) Field of Classification Search
  CPC ......... E04C 2/296; E04C 2/365; E04C 2/292; E04C 2/284; E04C 2/32; E04C 2/384
  USPC ............. 52/309.4, 309.5, 309.6, 309.8, 309.9
  See application file for complete search history.

(56) References Cited

U.S. PATENT DOCUMENTS

| | | | |
|---|---|---|---|
| 3,753,843 A | 8/1973 | Hutchison | |
| 4,196,950 A | 4/1980 | Churchill et al. | |
| 5,784,845 A | 7/1998 | Imeokparia et al. | |
| 5,787,665 A * | 8/1998 | Carlin et al. | 52/309.4 |
| 6,220,388 B1 | 4/2001 | Sanborn | |
| 6,256,959 B1 | 7/2001 | Palmersten | |
| 7,419,031 B2 | 9/2008 | Liguore et al. | |
| 7,526,903 B2 | 5/2009 | Kandasamy | |
| 8,070,994 B2 * | 12/2011 | Carlson et al. | 264/46.5 |
| 8,334,055 B2 | 12/2012 | Gall et al. | |
| 8,453,390 B2 * | 6/2013 | Letts et al. | 52/90.2 |
| 8,465,832 B2 | 6/2013 | Jones | |
| 8,484,918 B2 | 7/2013 | Merkel | |
| 2007/0193158 A1 * | 8/2007 | Miller et al. | 52/309.9 |
| 2007/0256379 A1 * | 11/2007 | Edwards | 52/309.9 |
| 2008/0086982 A1 * | 4/2008 | Parenteau et al. | 52/794.1 |
| 2008/0148663 A1 * | 6/2008 | Peede et al. | 52/309.9 |
| 2009/0235599 A1 * | 9/2009 | Ware et al. | 52/309.9 |
| 2013/0207413 A1 | 8/2013 | Lookebill et al. | |
| 2014/0000193 A1 * | 1/2014 | Daniels et al. | 52/232 |
| 2014/0000194 A1 * | 1/2014 | Daniels et al. | 52/232 |
| 2014/0000195 A1 * | 1/2014 | Daniels et al. | 52/232 |
| 2014/0000196 A1 * | 1/2014 | Daniels et al. | 52/232 |

FOREIGN PATENT DOCUMENTS

| | | |
|---|---|---|
| CA | 2533692 | 2/2005 |
| CA | 2791790 | 3/2011 |
| CN | 103373014 | 10/2013 |
| CN | 203296295 | 11/2013 |
| EP | 2428358 | 3/2012 |

* cited by examiner

*Primary Examiner* — Mark Wendell
*Assistant Examiner* — Keith Minter
(74) *Attorney, Agent, or Firm* — Welsh Flaxman & Gitler LLC

(57) ABSTRACT

A thermal barrier double-wall construction panel made up of at least four layers which includes a foam insulation core with exterior and interior surface sides, an inner and an outer liner (or skin), and at least one engineered thermal barrier support structure located between the foam core and one of the liners.

8 Claims, 7 Drawing Sheets

HIGH STRENGTH THERMAL BARRIER PANEL FOR AN H.V.A.C. UNIT HOUSING

CROSS REFERENCE TO RELATED APPLICATIONS

This application is a continuation-in-part of U.S. patent application Ser. No. 14/166,059, entitled "HIGH STRENGTH THERMAL BARRIER FOR AN H.V.A.C. UNIT HOUSING", filed Jan. 28, 2014, which is currently pending.

BACKGROUND OF THE INVENTION

1. Field of the Invention

The subject invention generally pertains to commercial and industrial equipment for the Heating, Ventilation, and Air Conditioning (H.V.A.C.) industry. In particular, the invention relates to an H.V.A.C. housing (also called an H.V.A.C. cabinet or unit) which is insulated with foamed insulation and composed of materials intended to create a thermal barrier to isolate the insulation from the interior of the building, in conformance with the International Building Code (I.B.C.).

2. Description of Related Art

Heat exchangers, compressors, blowers, filters and other H.V.A.C. equipment are often housed within an air handling enclosure. The enclosure helps shelter the equipment, provides a sound barrier, and perhaps most importantly, the enclosure provides a conduit for directing the air through the equipment. Air handling enclosures usually comprise a number of sheet metal panels that are interconnected to create a box-like structure.

The most current state of the art for H.V.A.C. enclosure design is an inner and outer layer of sheet metal enclosing a foam insulation core. Therefore, the current H.V.A.C. panel design can be described as a three-layer sandwich assembly composed of an inner liner (usually sheet metal), insulation (usually foam insulation, but occasionally fiberglass insulation, creating the core of the panel), and an outer liner (usually sheet metal). Reference is made to U.S. Pat. No. 7,526,903 (2005) which provides a description and drawings of the state of the art, and which is incorporated herein by reference.

In most cases, the panels are insulated to minimize heat loss between the interior and exterior of the enclosure. The primary functions of the insulation are to provide a reduction in sound transmission from the enclosed machinery into the surrounding space and to improve operating efficiency by minimizing undesirable heat loss or gain into the surrounding space. Insulation is rated according to its thermal resistance, or R-value, with a higher value being more desirable. In the past, fiberglass batt insulation has been used, and currently many major manufacturers have converted from using fiberglass batt to using some type of expanded foam insulation. Fiberglass batt can have an R-value varying from approximately 3.0 to 4.0 per inch thickness, and expanded foam insulation can have an R-value of anywhere between 4.0 and 7.5 or above, per inch thickness.

FIG. 4 illustrates a current state of the art panel composed of a polyurethane foam core 42 with an interior metal liner 41 and an exterior metal liner 43. The major disadvantages of using this type of barrier with an expanded foam insulation are the flame, smoke and chemical by-products generated by the foam during a fire. In addition, there is a tendency for the polyurethane foam core 42 to delaminate from its metal liners 41, 43.

Due to the fire and smoke characteristics of foam insulation, the I.B.C. requires that any foam insulation used in a building be isolated from the interior of the building by an approved thermal barrier. Sheet metal is not approved as a thermal barrier, and consequently the need exists for a panel design that can provide this barrier.

It is also appreciated that H.V.A.C. air distribution equipment operates with a static pressure differential across the housing walls. This pressure differential causes a deflection in the panels resulting in a slight bowing of the panels. This bowing puts high stress on the bond between the foam insulation and the metal of the panel, often leading to delamination and structural weakness.

It is also an object of the present invention to provide an air handling enclosure with self-supporting, insulated thermal panels using a core of foam insulation, and satisfying the current I.B.C. (2012) requirements for thermal barriers over foam insulation. This invention uses an engineered barrier between the inner and/or outer liners and the insulation to create a thermal barrier assembly.

Another object of the invention is to use a foam insulation core with an engineered honeycomb structural layer located between the core and the inner and outer liners.

Another object of the invention is to provide a thermal barrier for any type of insulation core, whether it is foamed in place or made of pre-manufactured sheets, and whether it be polyurethane, polypropylene, polyvinyl chloride (P.V.C.) or any other type of insulation for which the I.B.C. requires a thermal barrier.

Another object of the invention is to use fiberglass reinforced plastic inner and/or outer liners. Fiberglass reinforced plastic has a higher thermal resistance than steel or aluminum and therefore contributes to the properties of a thermal barrier. The use of fiberglass reinforced plastic liners allows a slight reduction in the thickness of the engineered barrier.

Another object of the invention is to use a chemical bonding agent, such as a resin between the polyurethane insulation, the structural core, and the panel outer walls. This embodiment may include a fiberglass weave, cloth, mat, or other porous material to help absorb resin and bond the polyurethane to the structural core.

SUMMARY OF THE INVENTION

A thermal barrier double-wall construction panel used in the H.V.A.C industry with an insulating foam core with a first side and an opposed second side, with interior and/or exterior engineered structural coverings secured to the first and/or second sides of the insulating foam core. The thermal barrier double-wall construction panel may have the insulating foam core made from a polyurethane foam or a polyvinyl chloride foam, or any other foam plastic as defined by the I.B.C. 2012 as requiring a thermal barrier. The thermal barrier double-wall construction panel of may also have the engineered structural cover made from a honeycombed structure, such as a polypropylene honeycomb structure or an aluminum engineered support structure. The engineered support structure is made up of a rigid frame structure which creates air gaps, wherein the air gaps represent a significant contribution to the thermal performance of the barrier. The engineered structural covering made from a honeycombed structure can have circles, triangles, squares or other geometric forms in the honeycombed configuration.

Provided is a thermal barrier double-wall construction panel 55 used in the H.V.A.C industry with an insulating foam core 52 with a first side 56 and an opposed second side 58, with interior and/or exterior engineered structural coverings 51, 53 secured to the first and/or second sides of the insulating foam core 52. The thermal barrier double-wall construction panel 55 may have the insulating foam core made from polyurethane or polyvinyl chloride foam, or any other foam plastic as defined by the I.B.C. as requiring a thermal barrier. The thermal barrier double-wall construction panel 55 may also have the engineered structural cover 51, 53 made from a honeycombed structure, such as a polypropylene honeycomb structure or an aluminum engineered support structure. The engineered support structure is made up of a rigid frame structure which creates air gaps, wherein the air gaps represent a significant contribution to the thermal performance and reduction of the weight of the barrier.

A chemical bonding layer such as a resin-absorbing material may be used to increase the bonding between the foam core 52 and the engineered barriers 51, 53, and the foam core 52, the engineered barriers 51, 53 and the inner liner and outer liner 50, 54 increase the overall H.V.A.C. housing wall strength. H.V.A.C housings can be rated to many different standards of strength: one example being TAS 201 issued by the International Code Council and required for Miami Dade County notice of acceptance. The addition of a layer is designed to hold wet resin in place between the foam core 52 and the engineered barrier 51, 53 and the engineered barrier 51, 53 to the inner liner 50 and an outer liner 54 as it dries, to create a high strength bond, and will increase the panel strength.

DETAILED DESCRIPTION OF THE INVENTION

Figure 1:
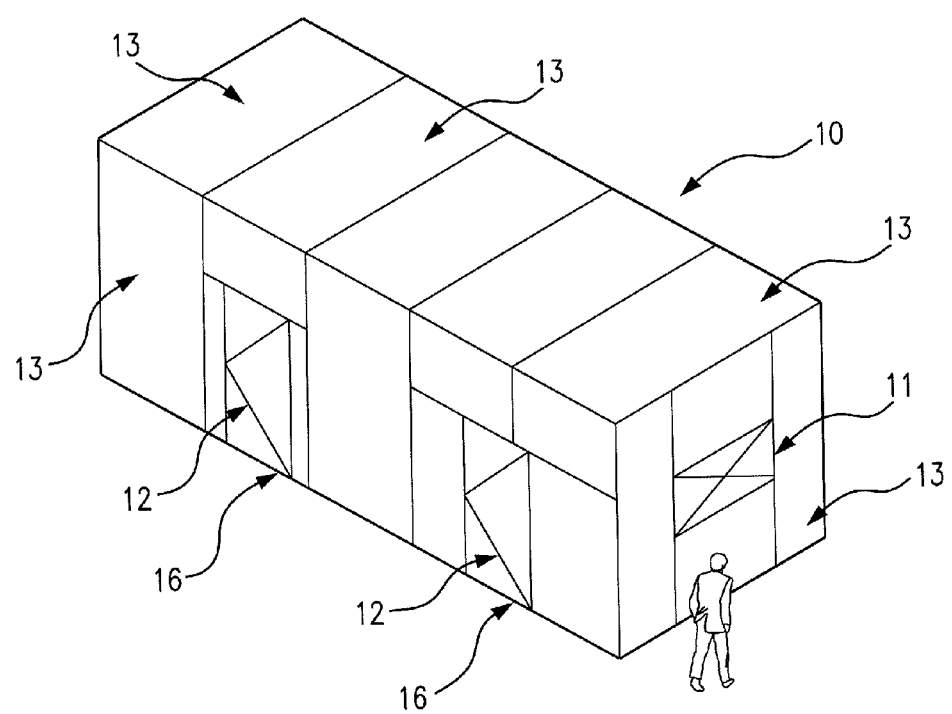
FIG. 1 is a perspective view of the present H.V.A.C. housing.
Figure 2:
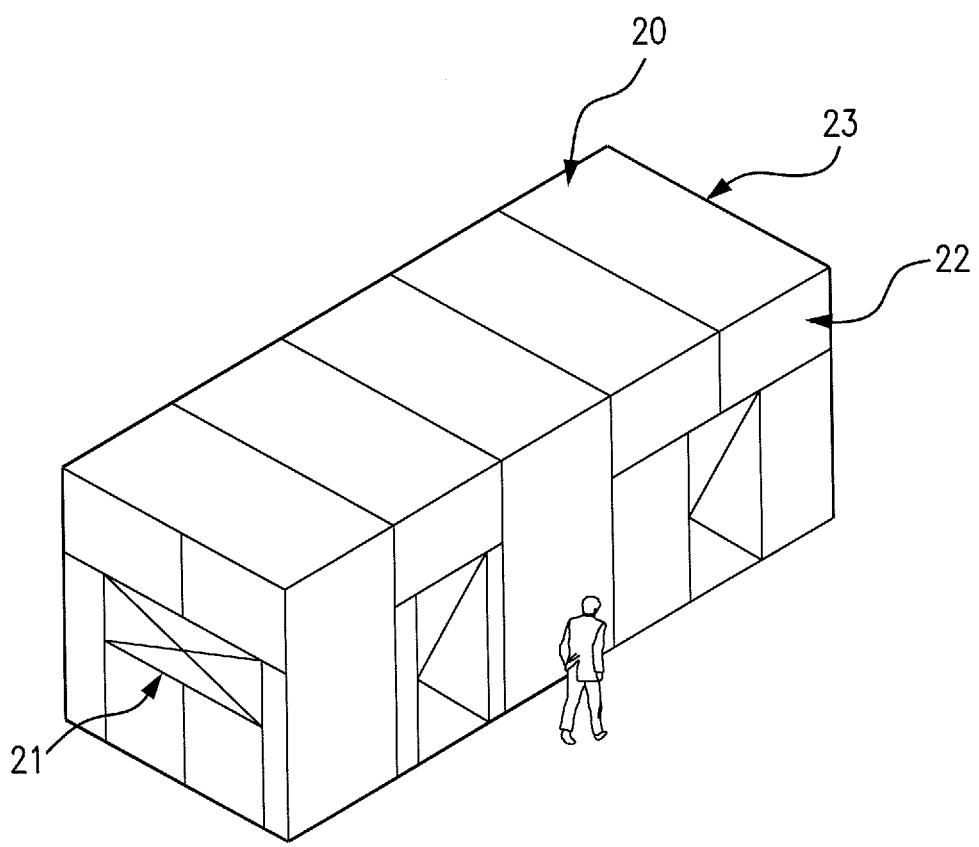
FIG. 2 is a perspective view of the housing shown in FIG. 1 from a reverse angle.
Figure 3:
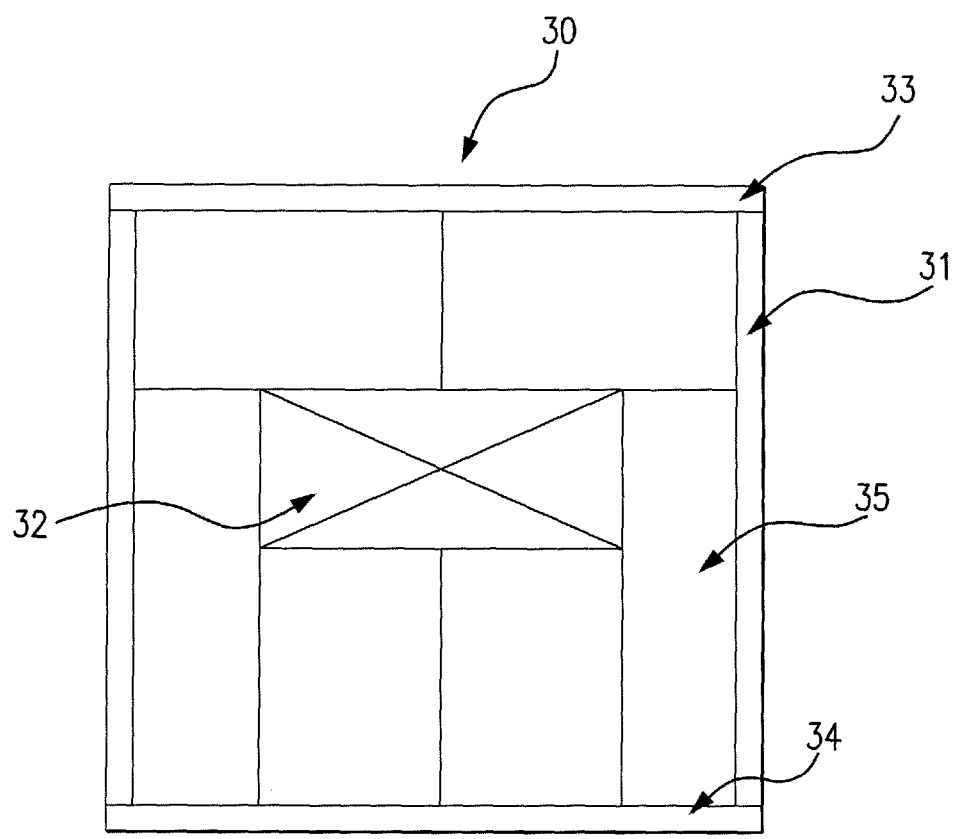
FIG. 3 is an end-view of the housing shown in FIG. 2.
Figure 4:
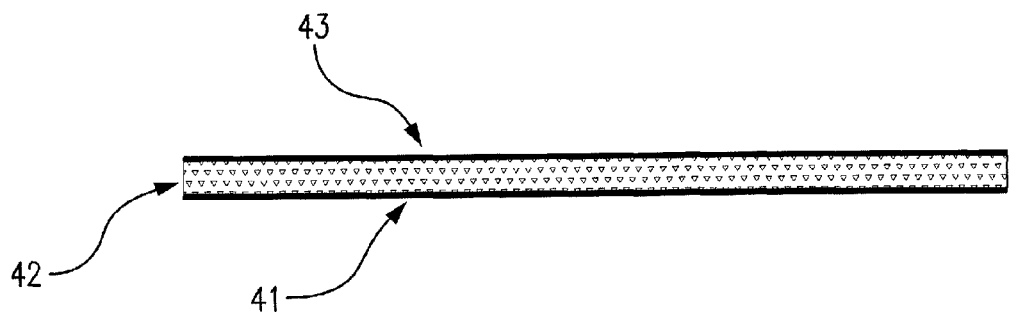
FIG. 4 is a detailed cross-sectional view of a current state-of-the-art housing panel, using inner and outer liners of sheet metal encapsulating a foam insulation core.

The detailed embodiment of the present invention is disclosed herein. It should be understood, however, that the disclosed embodiment is merely exemplary of the invention, which may be embodied in various forms. Therefore, the details disclosed herein are not to be interpreted as limiting, but merely as a basis for teaching one skilled in the art how to make and/or use the invention.

Referring to FIGS. 1 to 9, the invention is directed to a thermal barrier double-wall construction panel 55 and an H.V.A.C. housing 10 made from a plurality of thermal-barrier double-wall construction panels 55. The thermal barrier double-wall construction panel 55 for an H.V.A.C. system assembly is built with an inner liner 50 and an outer liner 54, two thermal barrier layer(s) 51, 53 composed of engineered structural coverings, and a foam insulation core 52. The H.V.A.C. housing 10 is fabricated using the thermal barrier panel 55 and offers additional benefits including, low leakage, high strength and rigidity, sound damping characteristics, corrosion resistant characteristics when combined with fiberglass reinforced plastic liners, insulation and UV resistance. In fact, the improved housing 10 obtained leakage rates much lower than the industry currently can obtain. The SHEET METAL AND AIR CONDITIONING CONTRACTORS' NATIONAL ASSOCIATION "SMACNA" provides standards which cover leakage criteria and standards based on proven methods for testing ductwork and air handling units for air leaks measured in duct leakage class units. Typical commercial units have a SMACNA duct leakage class in the range of 12-24, custom air handling units have about a SMACNA duct leakage class of 6 and can obtain a SMACNA duct leakage class of 3 with some difficulty. The housing 10 of the present invention obtained a SMACNA duct leakage class under 2 and as low as 1 with standard design.

It is appreciated, that an H.V.A.C. housing includes, among other embodiments, air conditioning units, exhaust units, plenums, heating equipment, cooling equipment, ventilation equipment, and air-to-air or air-to-water energy recovery equipment. In summary, any H.V.A.C. equipment can have a housing made up of thermally insulated panels. The housing referred to in the present invention is an H.V.A.C. unit housing and it is appreciated the H.V.A.C. housing 10 may take various sizes and shapes for use in various applications. For the purposes of description, and with reference to FIGS. 1-3, the H.V.A.C. housing 10 is composed of a plurality of wall panels constructed in a rectangular shape with an inlet aperture 11, access door(s) 12 and outlet aperture 21. A single chamber H.V.A.C. housing 10 is disclosed with reference to FIG. 1. The H.V.A.C. housing 10 has an inlet aperture 11 and an outlet aperture 21 through which the air is directed as it moves from the source of air. The H.V.A.C. housing 10 also includes access aperture(s) 16, which are selectively covered by access doors 12, allowing for access to the H.V.A.C. housing 10. The H.V.A.C. housing 10 is defined basically by first and second lateral side wall panels 31 and 36, a floor panel 34, a roof panel 23, a front wall panel 37 and a rear wall panel 35. In accordance with a preferred embodiment, the front wall panel 37 is provided with the inlet aperture 32 and the rear wall panel 35 is provided with the outlet aperture 21. In addition, the first lateral side wall panel 13 is provided with access apertures 16 covered by the access doors 12 shaped and dimensioned to cover the access apertures as is known in the art. It is appreciated the inlet and outlet apertures 11, 21, as well as the access aperture(s), may be varied to suit specific needs, in particular, the size, location and shape of these apertures may be varied to suit specific needs.

Each of the first and second lateral side wall panels 13, 22, 31, the floor panel 34, the roof panel 33, the front wall panel 37 and the rear wall panel 35, as well as the access doors 12 are constructed from non-corrosive double-wall construction structural panels 55 as described below with reference to FIGS. 5 and 6. It is appreciated than an H.V.A.C. housing 10 in accordance with the present invention can be made up of one or many separate panels, or pieces, which can serve many purposes including acoustic separation, physical separation, protection, visual barrier, equipment encapsulation, air movement, or pressurization. The panel construction disclosed in this invention can be used, among other uses, to construct roof panels, wall panels, floor panels, door panels, or other partition panels.

Figure 5:
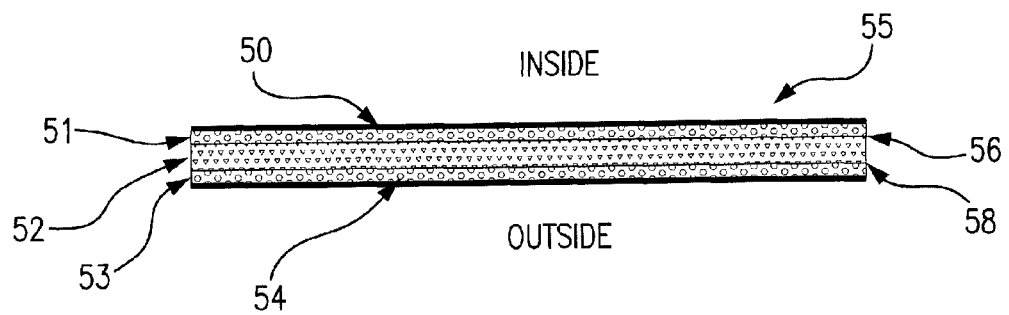
FIG. 5 is a cross-sectional view of the invention, using engineered barrier layers and fiberglass reinforced plastic liners encapsulating a foam insulation core.

In accordance with a preferred embodiment, and with reference to FIG. 5, each of the double-wall construction panels 55, that make up a H.V.A.C. housing 10, have a foam core 52. The foam core 52 is preferably made of a polyurethane foam insulation or polyvinyl chloride foam, to which an interior and exterior engineered structural covering 51, 53, for example NIDA-CORE®, is secured. In particular, the foam core 52 includes a first inner surface side 56 and an opposed second outer surface side 58. An interior engineered structural covering 51 is secured to the first inner surface side 56 of the foam core 52 and the exterior engineered structural covering 53 is secured to the second outer surface side 58 of the foam core.

The interior and exterior engineered structural coverings (also referred to as layers or barriers) 51, 53 are usually constructed in a similar manner. The current invention refers to any panel design requiring at least one side to satisfy the thermal barrier requirements of the I.B.C. (2012).

Figure 7:
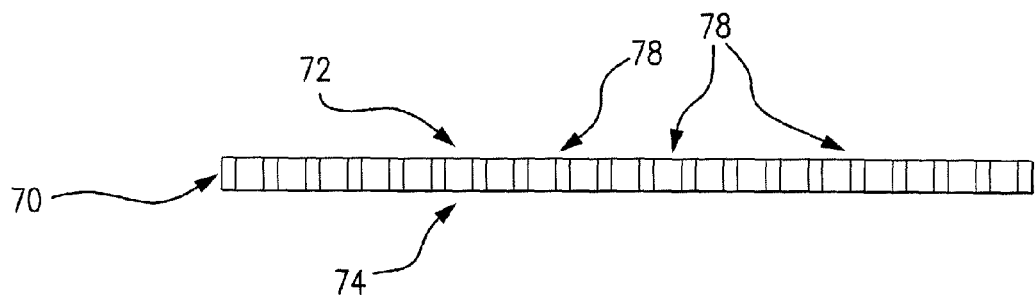
FIG. 7 is a cross-sectional view of one embodiment of the engineered barrier layer.
Figure 8:
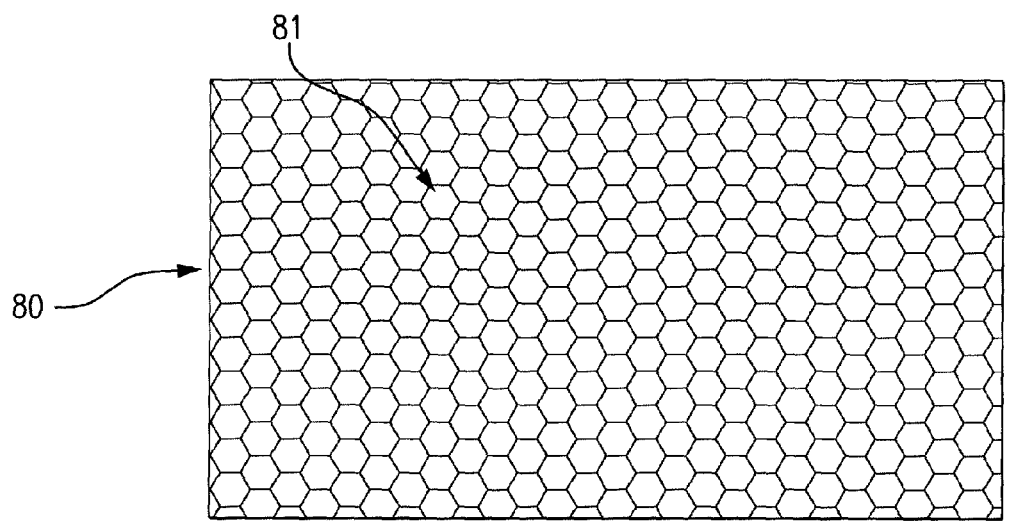
FIG. 8 is a detailed plan view of one embodiment of the engineered barrier layer.
Figure 9:
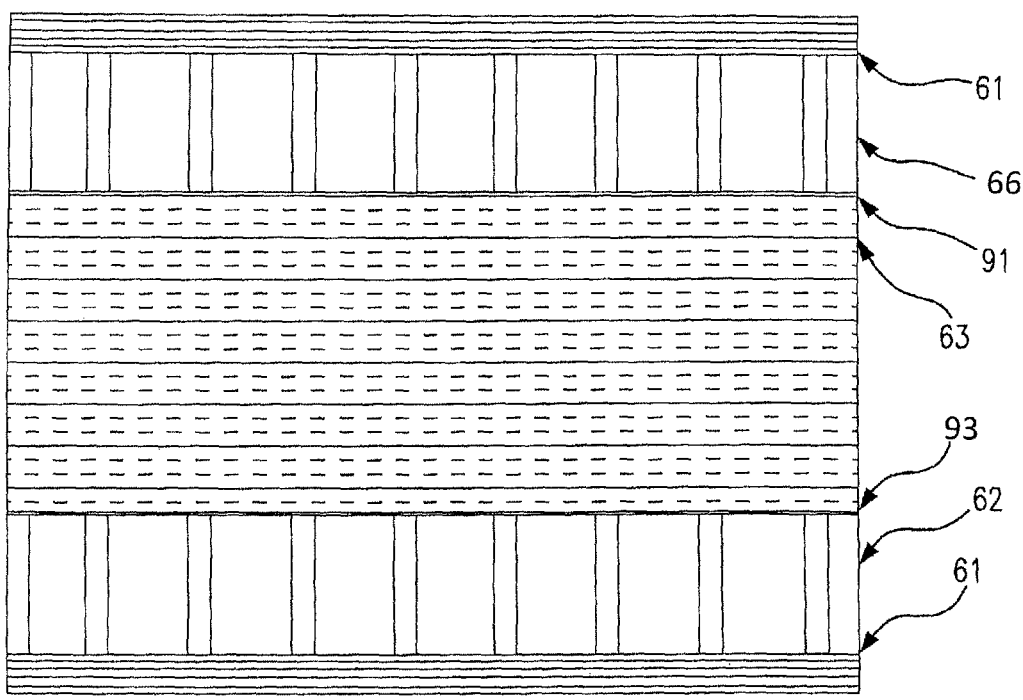
FIG. 9 is an alternate embodiment in a detailed cross-sectional view of a laminated construction structural panel including a resin-absorbent layer between the engineered barrier layer and the foam insulation core.

Referring to FIGS. 5, 7 and 8, the interior engineered structural covering 51 includes a central core 70, for example a polypropylene honeycomb sheet stock such as NIDA-CORE® or may be constructed of an aluminum honeycomb sheet stock material, having a first surface side 72 and an opposed second surface side 74 with air gaps 78 contained therein and defined by the honeycomb structure of the core. A top view of the polypropylene honeycomb sheet stock can be seen in FIG. 8. A liner (also known as a skin) 50 is secured on one side, for example, the first surface side 70, of the engineered structural covering 51, and the first inside surface side 56 of the foam core 52 is secured on the other side, that is the opposed second surface side 74 of the central core 70. The structural coverings are bonded in place using adhesives, resins, glues, or other mechanical means.

As to the exterior engineered structural covering 53, it is usually identical to the interior engineered structural covering 51. As such, the exterior engineered structural covering 53 includes a central core 70, for example fabricated from a polypropylene honeycomb sheet stock 80 such as NIDA-CORE® or may be constructed of an aluminum honeycomb sheet stock material, having a first surface side 72 and an opposed second surface side 74. A liner (also known as a skin) 54 is secured on one side, for example, the first surface side 72, of the engineered structural covering 53, and the second outer surface side 58 of the foam core 52 is secured on the other side, that is the opposed second surface side 74 of the central core 70.

Figure 6:
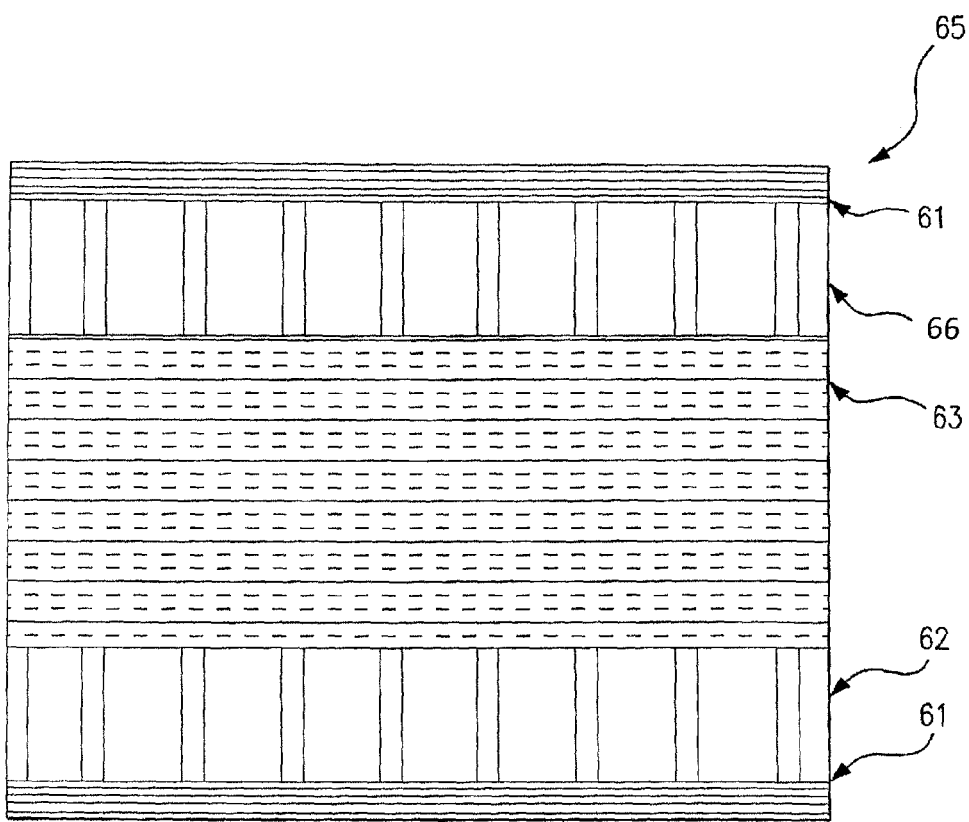
FIG. 6 is a detailed cross-sectional view of a laminated construction structural panel in accordance with the present invention.

In a preferred embodiment as shown in FIG. 6, the liners 50, 54 are composed of fiberglass reinforced plastic laminations saturated with resin. In a preferred embodiment, these laminations may be composed of, but not limited to, a surface gel coat, single or multiple layers of surface mat and woven roving.

It is appreciated that the panels described in this invention may be cut into multiple panels of desired sizes, which may then be used in the construction of an H.V.A.C. unit. In addition, it is appreciated the construction panel can be reinforced on one or both sides by a layer or layers of fiberglass, polyester, surface mat, woven roving, and/or gel coat.

Excellent strength and rigidity are provided, as well as a corrosion resistant structure, by the structural panels shown in FIG. 5 composed of a foam core 52, engineered structural coverings 51, 53 and liners 50, 54. In a preferred embodiment, the panels as depicted in FIG. 5 use a honeycomb sheet stock as depicted in FIGS. 7 and 8 composed of a co-polymer compound of polypropylene resulting in a structure with excellent specific rigidity (stiffness to weight) and energy absorption, while incorporating the material benefits of visco-elasticity.

It is appreciated the most common method of fabrication for the honeycomb central sheet stock is adhesive bonding flat sheets of material with offset lines of adhesive, and subsequently expanding them to open the cells. This technique is commonly used to fabricate honeycomb from paper or aluminum products. By contrast, honeycombs may also be constructed from thermoplastic materials by extruding profiles through a die and then joining them by thermal fusion to form large blocks, which eliminates the need for adhesives. Regardless of the method used, honeycomb sheet stock can be cut from the large blocks of honeycomb in the same fashion as foam or end-grain balsa. However, the sheet stock cut from the extruded profiles will possess mechanical properties in the longitudinal and transverse directions of the core that differ from the properties of adhesively bonded and expanded honeycombs.

In order to obtain maximum strength and eliminate delamination, this invention includes in an alternate embodiment, the addition of s chemical bonding layers 91, 93 such as a resin-absorbing material such as fiberglass cloth, mat, woven roving or other porous or semi-porous or absorbent material designed to absorb resin and hold it in place over the entire plane where the engineered barriers 62, 66 meet the foam core 63. (See FIG. 9) A plurality of skin layers 61 are provided on the exterior surfaces 65 of the engineered barriers 62, 66. This material serves to increase the bond strength between the foam core 63 and the engineered barriers 62, 66 and thus reduce the chance of delamination when the panels are exposed to differential pressure.

What is claimed is:

1. A thermal barrier double-wall construction panel, comprising;
   a. an insulating foam core layer with a first side and a second side, and
   b. at least one honeycombed structure layer secured to the first side of the insulating foam core layer and at least one honeycombed structure layer secured to the second side of the insulating foam core layer, and wherein the honeycombed structure layers are made up of a rigid frame structure with air gaps, and wherein at least one of the at least one honeycombed structure layers has a plurality of liners placed thereon.

2. The thermal barrier double-wall construction panel of claim 1, wherein the insulating foam core layer comprises polyurethane foam or polyvinyl chloride foam.

3. The thermal barrier double-wall construction panel of claim 1, wherein the at least one honeycombed structure layers are composed of a honeycombed polypropylene.

4. The thermal barrier double-wall construction panel of claim 1, wherein the at least one honeycombed structure layers comprise a honeycombed structure with circles, triangles, squares or other geometric forms.

5. The thermal barrier double-wall construction panel of claim 1, wherein a resin absorbent material is located between the insulating foam core layer and the at least one honeycombed structure layers to hold a resin throughout a plane of contact between the insulating foam core layer and the at least one honeycombed structure layers to increase a bond strength between them.

6. The thermal barrier double-wall construction panel of claim 5, wherein the resin absorbent layer is a woven roving, fiberglass cloth, or fiberglass mat.

7. The thermal barrier double-wall construction panel of claim 1, wherein a resin absorbent material is located between the at least one honeycombed structure layers and at least one liner covering the at least one honeycombed structure layers to hold a resin throughout a plane of contact between the at least one honeycombed structure layers and the at least one liner to increase a bond strength between them.

8. The thermal barrier double-wall construction panel of claim 1, wherein the insulating foam core layer is comprised of a plurality of foam core layers.

\* \* \* \* \*